(12) United States Patent
Thompson

(10) Patent No.: US 7,857,572 B1
(45) Date of Patent: Dec. 28, 2010

(54) LOAD MOVING SYSTEM

(76) Inventor: David D. Thompson, 3214 N. Houston School Rd., Lancaster, TX (US) 75134

( * ) Notice: Subject to any disclaimer, the term of this patent is extended or adjusted under 35 U.S.C. 154(b) by 0 days.

(21) Appl. No.: 12/255,422

(22) Filed: Oct. 21, 2008

(51) Int. Cl.
*B60P 3/40* (2006.01)
(52) U.S. Cl. ..................... 414/458; 280/47.29
(58) Field of Classification Search .......... 414/458; 280/47.27, 27.29
See application file for complete search history.

(56) References Cited

U.S. PATENT DOCUMENTS

| | | | |
|---|---|---|---|
| 2,450,690 A * | 10/1948 | Robins | 414/458 |
| 2,463,381 A * | 3/1949 | Hicks | 254/2 R |
| 3,486,650 A * | 12/1969 | Boone | 414/458 |
| 4,491,452 A * | 1/1985 | Matovich | 414/427 |
| 4,728,245 A | 3/1988 | Shelton | |
| D311,083 S | 10/1990 | Dutro | |
| 5,660,518 A | 8/1997 | Meier | |
| 6,357,063 B1 | 3/2002 | Selby | |
| 6,406,248 B1 | 6/2002 | McGill et al. | |
| 6,634,658 B2 | 10/2003 | Larouche | |

OTHER PUBLICATIONS

Handle. (n. d.). Dictionary.com Unabridged. Retrieved Oct. 26, 2009, from Dictionary.com website: http://dictionary.reference.com/browse/handle.*

* cited by examiner

*Primary Examiner*—Saúl J Rodríguez
*Assistant Examiner*—Jonathan D Snelting

(57) ABSTRACT

A load moving system includes a pair of lifting assemblies. The assemblies are positioned on opposite sides of a load to be carried. Each of the assemblies includes a plate. A vertical wall is attached to the plate and the plate extends forward from a bottom edge of the vertical wall. The plate is extendable under the load and the vertical wall is positionable against the load. An upper wall is attached to an upper portion of the vertical wall and extends rearward of the vertical wall. A pair of wheel assemblies is provided. Each of the wheel assemblies is positioned below and is rotatably coupled to the upper wall. A pair of support posts is attached to and extends upwardly from the upper wall. A coupling assembly releasably couples the support posts to the load.

2 Claims, 6 Drawing Sheets

LOAD MOVING SYSTEM

BACKGROUND OF THE INVENTION

Field of the Invention

The present invention relates to load lifting and moving devices and more particularly pertains to a new load lifting and moving device for assisting a person in moving an elongated load across a floor surface.

SUMMARY OF THE INVENTION

The present invention meets the needs presented above by generally comprising a pair of lifting assemblies. The assemblies are positioned on opposite sides of a load to be carried. Each of the assemblies includes a plate that has a front edge, a rear edge, a top side and a bottom side. A vertical wall is attached to the plate and the plate extends forward from a bottom edge of the vertical wall. The plate is extendable under the load and the vertical wall is positionable against the load. An upper wall is attached to an upper portion of the vertical wall and extends rearward of the vertical wall. A pair of wheel assemblies is provided. Each of the wheel assemblies is positioned below and is rotatably coupled to the upper wall. A pair of support posts is attached to and extends upwardly from the upper wall. A coupling assembly releasably couples the support posts to the load.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
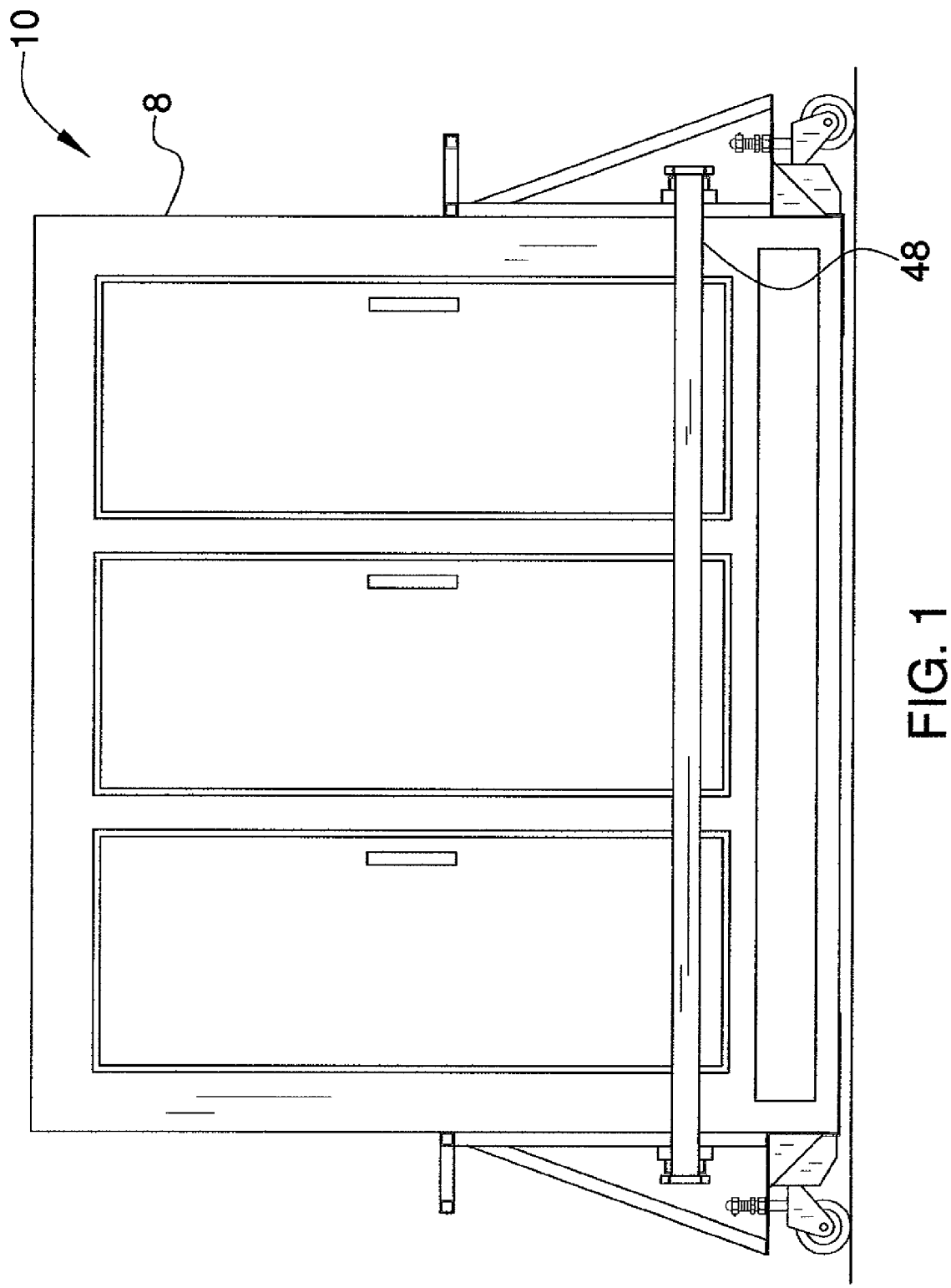
FIG. 1 is a front in-use view of a load moving system according to the present invention.
Figure 2:
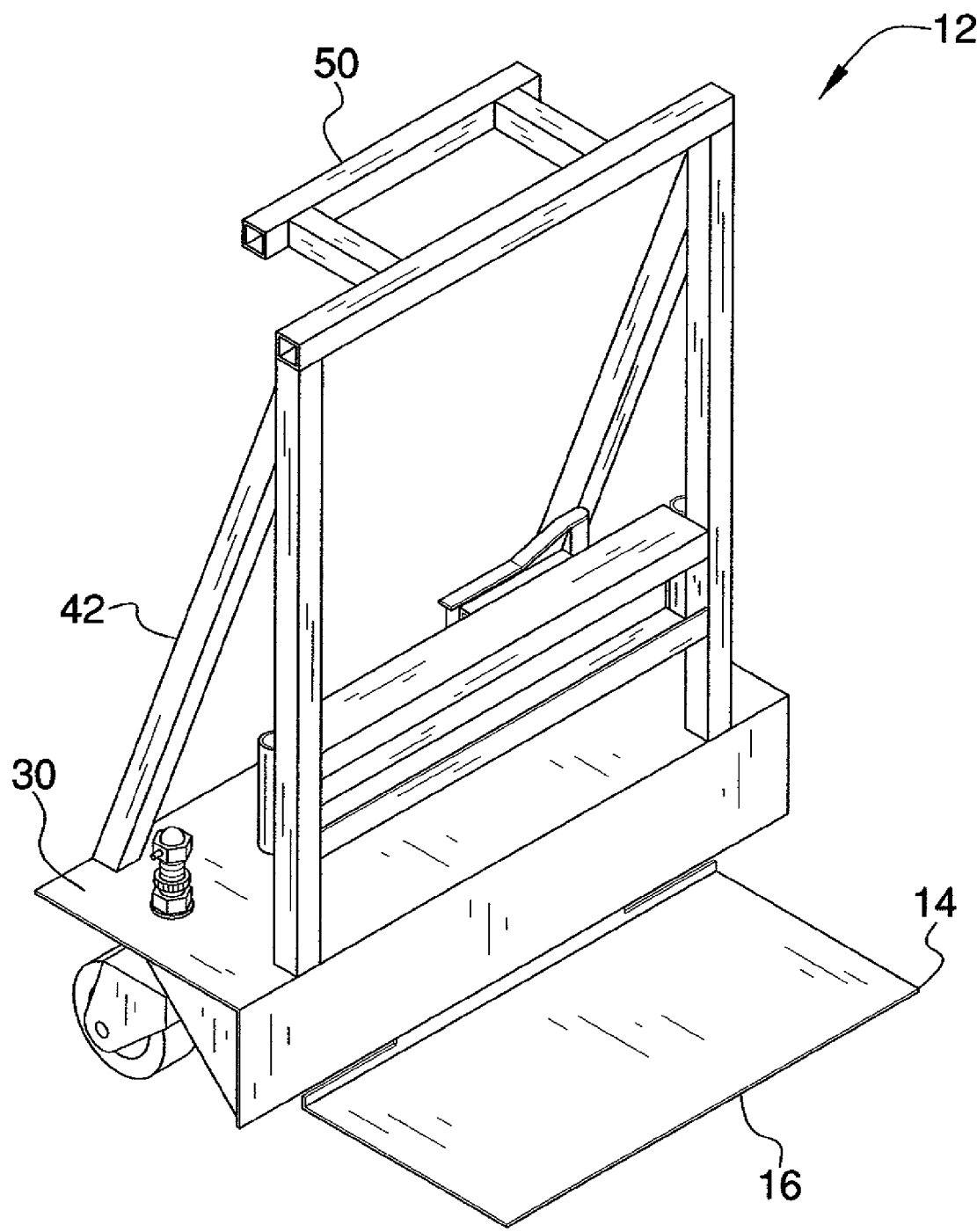
FIG. 2 is a front perspective view of the present invention.
Figure 3:
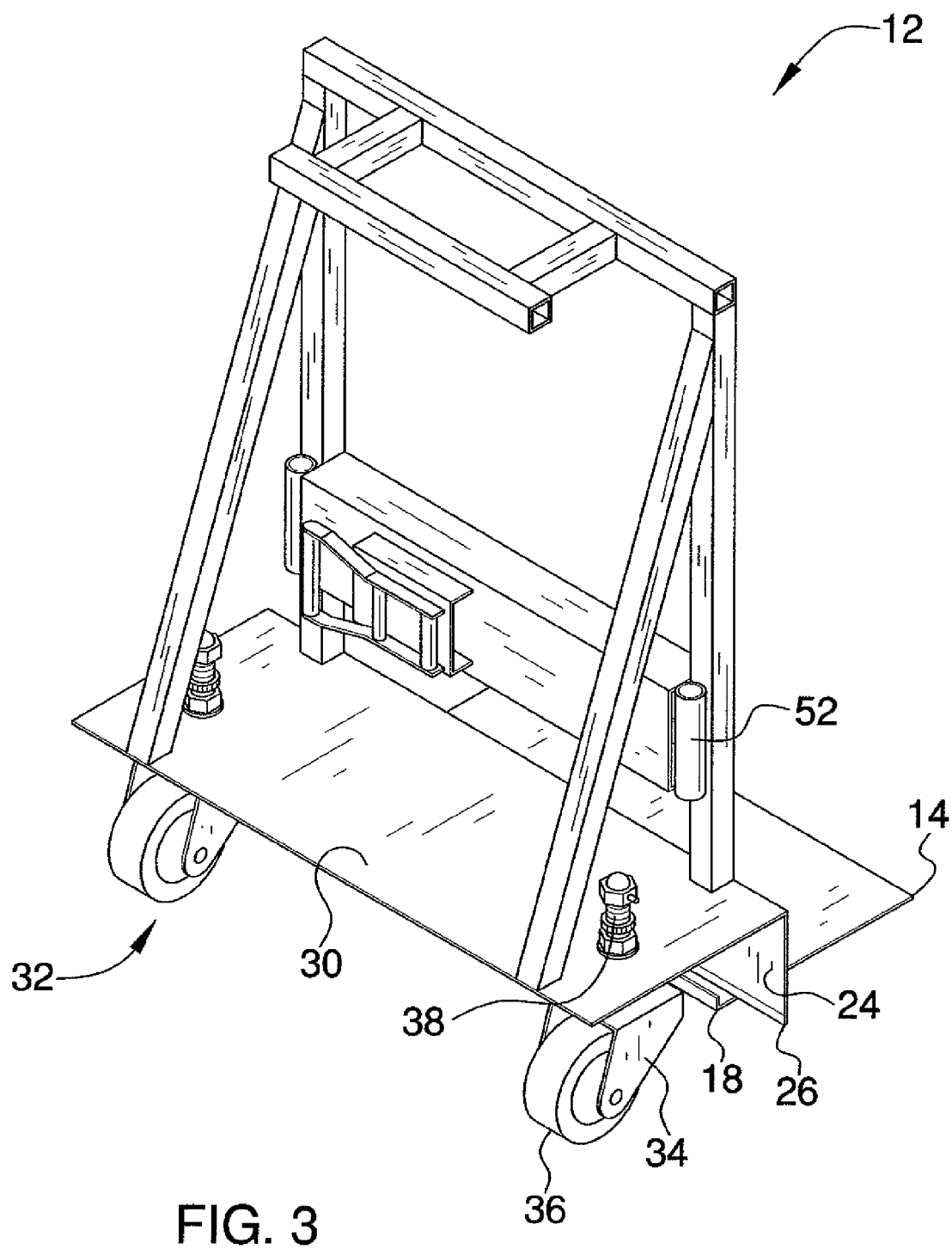
FIG. 3 is a rear perspective view of the present invention.
Figure 4:
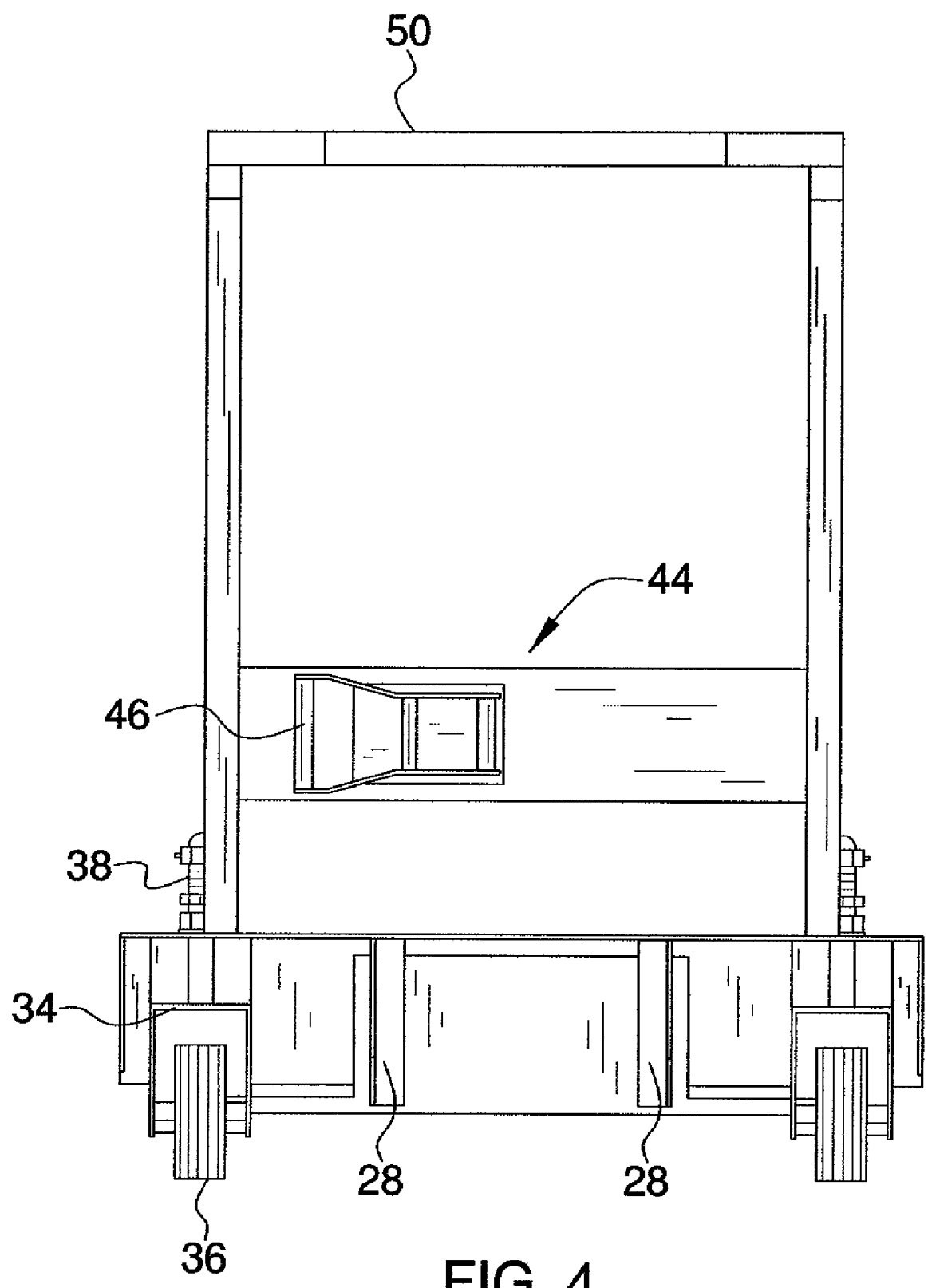
FIG. 4 is a rear view of the present invention.
Figure 5:
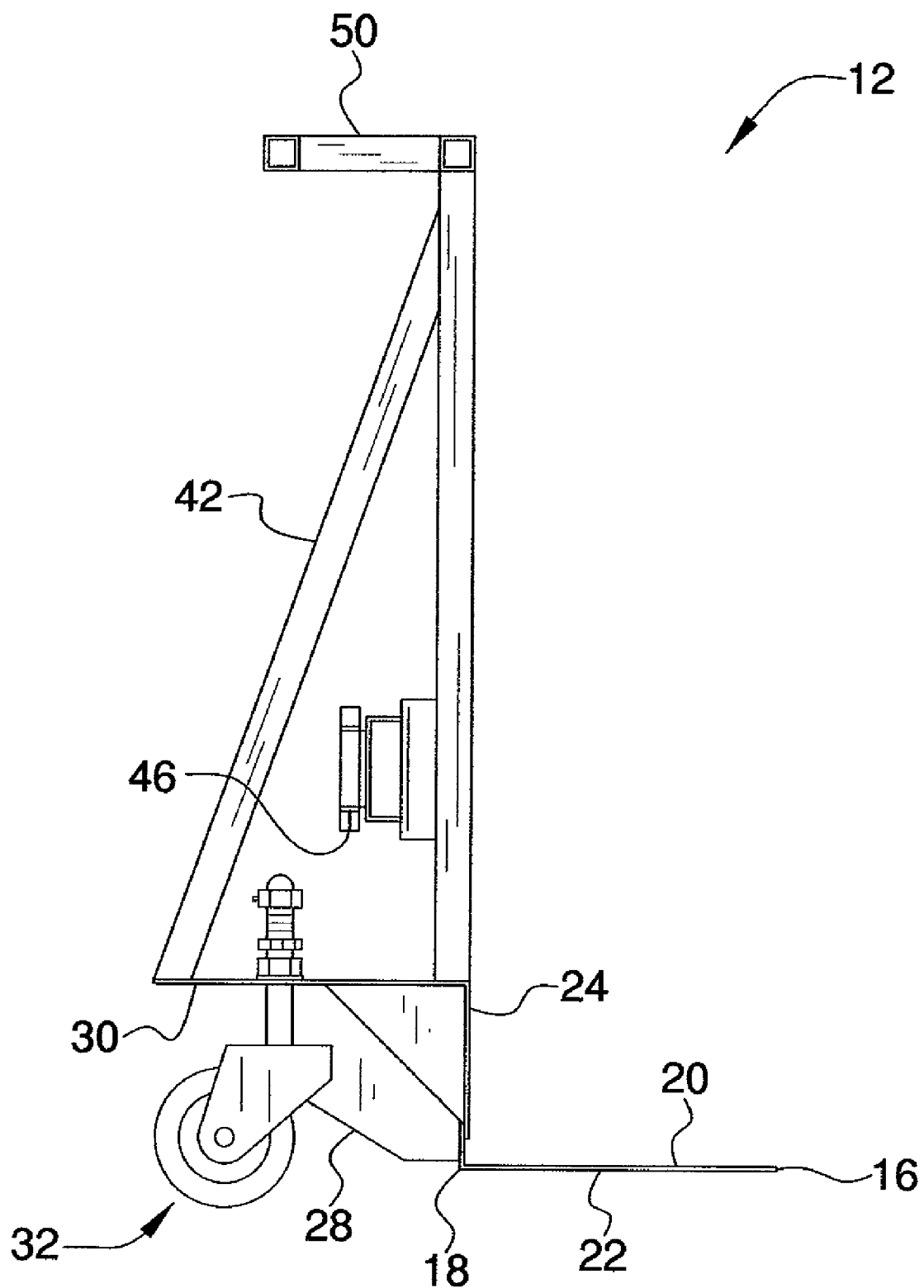
FIG. 5 is a side view of the present invention.
Figure 6:
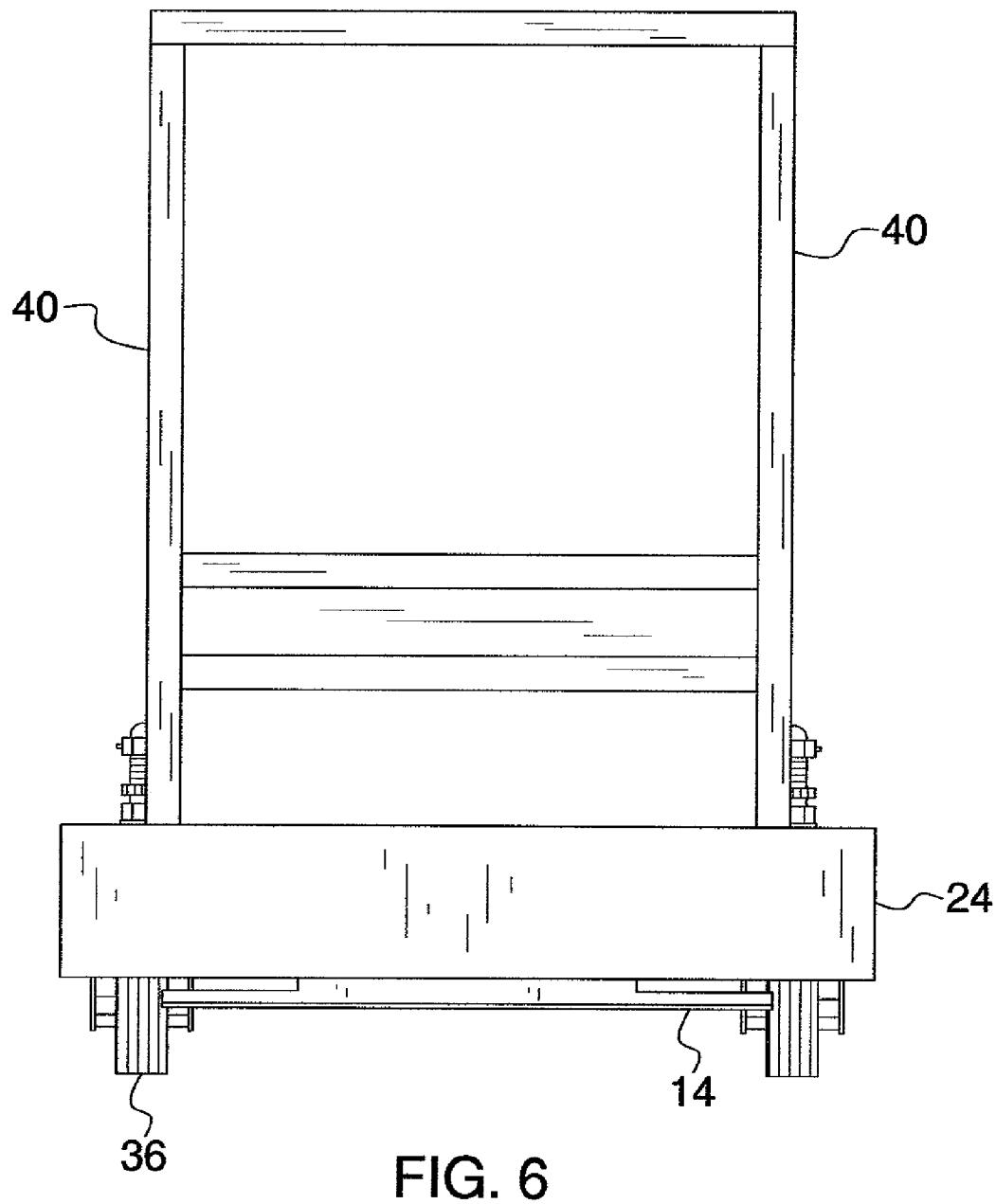
FIG. 6 is a front view of the present invention.

With reference now to the drawings, and in particular to FIGS. 1 through 6 thereof, a new load lifting and moving device embodying the principles and concepts of the present invention and generally designated by the reference numeral 10 will be described.

As best illustrated in FIGS. 1 through 6, the load moving system 10 generally comprises a pair of lifting assemblies 12. The lifting assemblies 12 are positioned on opposite sides of a load 8 to be carried. Each of the lifting assemblies 12 includes a plate 14 that has a front edge 16, a rear edge 18, a top side 20 and a bottom side 22. The plate 14 has a width between 40.64 cm and 50.8 cm (16 inches and 20 inches). A vertical wall 24 is attached to the plate 14. The plate 14 extends forward from a bottom edge 26 of the vertical wall 24. The plate 14 is extendable under the load 8 and the vertical wall 24 is positionable against the load 8. An upper wall 30 is attached to an upper portion of the vertical wall 24 and extends rearward of the vertical wall 24. Support panels 28 extend between the upper wall 30 and plate 14.

The lifting assemblies 12 further each include a pair of wheel assemblies 32. Each of the wheel assemblies 32 is positioned below and is rotatably coupled to the upper wall 30. The wheel assemblies 32 each extend beneath a plane of the bottom side 22 of the plate 14 when the plate 14 is horizontally oriented. Each of the wheel assemblies 32 includes a swivel 34 pivotally coupled to the upper wall 30, a wheel 36 rotatably coupled to the swivel 34 and a swivel rod 38 attached to the upper wall 30 and coupling the swivel 34 to the upper wall 30. The swivel rod 38 comprised a threaded bolt having a locking nut positioned thereon. The swivel rod is adjustable to adjust a distance of the wheel 36 from the upper wall 30.

The lifting assemblies 12 further each include a pair of support posts 40 that are attached to and extend upwardly from the upper wall 30. The support posts 40 are positioned adjacent to the vertical wall 26. The support posts 40 have a height between 60.96 cm and 76.2 cm (24 inches and 30 inches). A plurality of braces 42 is attached to and extends between the upper wall 30 and the support posts 40. A coupling assembly 44 releasably couples the support posts 40 to the load 8. The coupling assembly 44 includes a conventional ratcheting member 46 attached to the support posts 40 and a strap 48 that is extended around the load 8 and coupled to the ratchet. A handle 50 is attached to the support posts 40.

In use, each plate 14 is extended under the load 8, such as a multi-door cooler. The strap 48 is then extended around a lateral edge of the load and coupled to the ratchet 46. Either one or two straps 48 may be used. If only one strap 48 is used, which will reach around the entire load 8, only one ratchet 46 may be used. Rounded guides 52 protect the strap 48. When the strap 48 is tightened, the vertical wall 24 is pulled against the load 8 and the plate 14 is moved to a horizontal position. This places the weight of the load 8 on the wheels 36 so that the load 8 may be easily moved at low floor clearance where needed. The ability to raise or lower the wheels 36 allows the plate 14 to remain level and between 1.27 cm and 6.985 cm (0.5 inches and 2.75 inches) off of a floor surface.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:
1. A load moving system consisting of:
a pair of lifting assemblies, said lifting assemblies being positioned on opposite sides of a load to be carried, each of said lifting assemblies consisting of;
- a plate having a front edge, a rear edge, a top side and a bottom side;
- a vertical wall being attached to said plate, said plate extending forward from a bottom edge of said vertical wall, said plate being extendable under the load and the vertical wall being positionable against the load;
- an upper wall being attached to an upper portion of said vertical wall and extending rearward of said vertical wall;
- a pair of wheel assemblies, each of said wheel assemblies being positioned below and being rotatably coupled to said upper wall, each of said wheel assemblies consisting of;
  - a swivel pivotally coupled to said upper wall;
  - a wheel rotatably coupled to said swivel; and
  - a swivel rod attached to said upper wall and coupling said swivel to said upper wall, said swivel rod being adjustable to adjust a distance of said wheel from said upper wall, said swivel rod consisting of a threaded bolt having a locking nut positioned thereon;
- a pair of support posts being attached to and extending upwardly from said upper wall;
- a coupling assembly releasably coupling said support posts to the load.

2. A load moving system consisting of:
a pair of lifting assemblies, said lifting assemblies being positioned on opposite sides of a load to be carried, each of said lifting assemblies consisting of;
- a plate having a front edge, a rear edge, a top side and a bottom side, said plate having a width between 40.64 cm and 50.80 cm;
- a vertical wall being attached to said plate, said plate extending forward from a bottom edge of said vertical wall, said plate being extendable under the load and the vertical wall being positionable against the load;
- an upper wall being attached to an upper portion of said vertical wall and extending rearward of said vertical wall;
- a pair of wheel assemblies, each of said wheel assemblies being positioned below and being rotatably coupled to said upper wall, said wheel assemblies each extending beneath a plane of said bottom side of said plate when said plate is horizontally oriented, each of said wheel assemblies consisting of;
  - a swivel pivotally coupled to said upper wall;
  - a wheel rotatably coupled to said swivel;
  - a swivel rod attached to said upper wall and coupling said swivel to said upper wall, said swivel rod being adjustable to adjust a distance of said wheel from said upper wall, said swivel rod consisting of a threaded bolt having a locking nut positioned thereon;
- a pair of support posts being attached to and extending upwardly from said upper wall, said support posts being positioned adjacent to said vertical wall, said support posts having a height between 24 inches and 36 inches;
- a plurality of braces being attached to and extending between said upper wall and said support posts;
- a coupling assembly releasably coupling said support posts to the load, said coupling assembly consisting of a ratcheting member attached to said support posts and a strap being extended around the load and coupled to said ratchet; and
- a handle being attached to said support posts.

* * * * *